United States Patent
Kim (10) Patent No.: US 12,427,673 B2
(45) Date of Patent: Sep. 30, 2025

(54) APPARATUS AND METHOD FOR CONTROLLING RAIL BOARDING FOR AUTONOMOUS DRIVING OF A MOBILE ROBOT

(71) Applicant: ELECTRONICS AND TELECOMMUNICATIONS RESEARCH INSTITUTE, Daejeon (KR)

(72) Inventor: Ki Seok Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 394 days.

(21) Appl. No.: 17/952,549

(22) Filed: Sep. 26, 2022

(65) Prior Publication Data
US 2023/0150140 A1    May 18, 2023

(30) Foreign Application Priority Data
Nov. 15, 2021  (KR) .................. 10-2021-0156845

(51) Int. Cl.
*B25J 9/16*   (2006.01)
(52) U.S. Cl.
CPC .................. *B25J 9/1697* (2013.01)
(58) Field of Classification Search
CPC ...... B25J 9/1697; B25J 9/1664; B25J 9/1684; B25J 5/02
See application file for complete search history.

(56) References Cited

U.S. PATENT DOCUMENTS

| | | | |
|---|---|---|---|
| 2007/0031217 A1* | 2/2007 | Sharma ................. | B25J 18/025 414/222.08 |
| 2009/0326713 A1* | 12/2009 | Moriya ................. | B25J 9/1676 701/25 |
| 2014/0330451 A1 | 11/2014 | Lee et al. | |

(Continued)

FOREIGN PATENT DOCUMENTS

| KR | 10-2041664 B1 | 11/2019 |
|---|---|---|
| KR | 20210131567 A * | 4/2020 |

(Continued)

*Primary Examiner* — Khoi H Tran
*Assistant Examiner* — Tristan J Greiner
(74) *Attorney, Agent, or Firm* — LRK PATENT LAW FIRM (57) ABSTRACT

Provided is an apparatus for controlling rail boarding for autonomous driving of a mobile robot. The apparatus includes: a sensor module configured to acquire sensing information for recognizing a surrounding environment of the mobile robot; a detection module configured to detect a boarding target rail of the mobile robot based on the sensing information, set line information in the detected rail region, and set an entry line from the line information; a memory configured to store a control program for the rail boarding of the mobile robot is stored based on the detected information; and a processor configured to convert the entry line into a robot (real) coordinate system, set an entry point for moving to the entry line is set, and generate driving information for movement within the set entry point and entry line, as the program stored in the memory is executed.

16 Claims, 6 Drawing Sheets

(56) References Cited

U.S. PATENT DOCUMENTS

| | | | |
|---|---|---|---|
| 2019/0302775 A1* | 10/2019 | Palan | G05D 1/661 |
| 2020/0198135 A1* | 6/2020 | Zhang | G05D 1/0274 |
| 2020/0207391 A1* | 7/2020 | Khosla | B61L 27/14 |
| 2021/0278848 A1 | 9/2021 | An et al. | |

FOREIGN PATENT DOCUMENTS

| | | |
|---|---|---|
| KR | 10-2107619 B1 | 5/2020 |
| KR | 10-2021-0131567 A | 11/2021 |

* cited by examiner

APPARATUS AND METHOD FOR CONTROLLING RAIL BOARDING FOR AUTONOMOUS DRIVING OF A MOBILE ROBOT

CROSS-REFERENCE TO RELATED APPLICATION

This application claims priority to and the benefit of Korean Patent Application No. 10-2021-0156845, filed on Nov. 15, 2021, the disclosure of which is incorporated herein by reference in its entirety.

BACKGROUND

1. Technical Field

The present invention relates to an apparatus and method for controlling rail boarding for autonomous driving of a mobile robot.

2. Description of Related Art

In recent decades, IoT-based smart farm cultivation systems have been applied to greenhouse environments. The smart farm cultivation systems have been performing automation of crop cultivation, crop growth management, pest control management, nutrient solution management, computerization of distribution, and the like.

In addition, for complete unmanned autonomy of crop cultivation and production management, autonomous driving-based transport carts, crop growth monitoring robots, harvest robots, pest control robots, and the like are in the development or commercialization stage.

Global route planning as a basic function of mobile robots that provide various services for smart farms is an essential function. In the case of some cultivation greenhouses, rails are installed on a floor and used as a transport aid for transport carts.

In operating a mobile robot in such a smart farm, in order for the mobile robot to move autonomously, not only general autonomous driving technology but also technology for boarding a rail is required if necessary.

However, in order for the mobile robot to board the rail, it is necessary to set an accurate location, but the localization accuracy is very low, so there is a problem that it is difficult to utilize the smart farm cultivation system.

In addition, mapping and localization may be performed by using high-performance Lidar, which incurs high costs and may often suffer from environmental constraints that may not utilize high-performance Lidar.

In addition, there may be a case in which a line of magnetic induction is buried or a mark such as a QR code is attached to a floor or fixtures of a cultivation greenhouse, but in the case of a non-standardized agricultural environment, there is a problem that the utilization is lowered.

SUMMARY

The present invention provides an apparatus and method for controlling rail boarding for autonomous driving of a mobile robot that enable the rail boarding by the autonomous driving by setting an optimal entry line and entry point for the rail boarding of the mobile robots in a smart farm environment where rails exist.

However, the problems to be solved by the present invention are not limited to the problems described above, and other problems may be present.

According to a first aspect of the present invention, an apparatus for controlling rail boarding for autonomous driving of a mobile robot includes: a sensor module configured to acquire sensing information for recognizing a surrounding environment of the mobile robot; a detection module configured to detect a boarding target rail of the mobile robot based on the sensing information, set line information in the detected rail region, and set an entry line from the line information; a memory configured to store a control program for the rail boarding of the mobile robot is stored; and a processor configured to convert the entry line into a robot (real) coordinate system, set an entry point for moving to the entry line is set, and generate driving information for movement within the set entry point and entry line, as the program stored in the memory is executed.

According to a second aspect of the present invention, a method of controlling rail boarding for autonomous driving of a mobile robot executed by a computer includes: acquiring sensing information for recognizing a surrounding environment of the mobile robot; detecting a boarding target rail of the mobile robot from the sensing information; setting line information in the detected rail; setting an entry line from the line information and converting the set entry line into a robot (real) coordinate system; setting an entry point for moving to the entry line; and generating driving information for movement within the set entry point and entry line.

A computer program according to another aspect of the present invention for solving the above-described problems is combined with a computer that is hardware to execute the method of controlling rail boarding for autonomous driving of mobile robot, and is stored in a computer-readable recording medium.

Other specific details of the invention are contained in the detailed description and drawings.

DETAILED DESCRIPTION OF EMBODIMENTS

The above-mentioned aspect, and other aspects, advantages, and features of the present disclosure and methods accomplishing them will become apparent from the following detailed description of exemplary embodiments with reference to the accompanying drawings.

Various advantages and features of the present invention and methods accomplishing them will become apparent from the following description of embodiments with reference to the accompanying drawings. However, the present invention is not limited to embodiments to be described below, but may be implemented in various different forms, these embodiments will be provided only in order to make the present invention complete and allow those skilled in the art to completely recognize the scope of the present invention, and the present invention will be defined by the scope of the claims.

Terms used in the present specification are for explaining embodiments rather than limiting the present invention. Unless otherwise stated, a singular form includes a plural form in the present specification. Throughout this specification, the term "comprise" and/or "comprising" will be understood to imply the inclusion of stated constituents but not the exclusion of any other constituents. Like reference numerals refer to like components throughout the specification and "and/or" includes each of the components described and includes all combinations thereof. Although "first," "second," and the like are used to describe various components, it goes without saying that these components are not limited by these terms. These terms are used only to distinguish one component from other components. Therefore, it goes without saying that the first component described below may be the second component within the technical scope of the present invention.

Unless defined otherwise, all terms (including technical and scientific terms) used in the present specification have the same meaning as meanings commonly understood by those skilled in the art to which the present invention pertains. In addition, terms defined in commonly used dictionaries are not ideally or excessively interpreted unless explicitly defined otherwise.

Hereinafter, an apparatus 100 for controlling rail boarding for autonomous driving of a mobile robot hereinafter, apparatus for controlling rail boarding of a mobile robot) according to an embodiment of the present invention will be described with reference to FIGS. 1 to 7.

Figure 1:
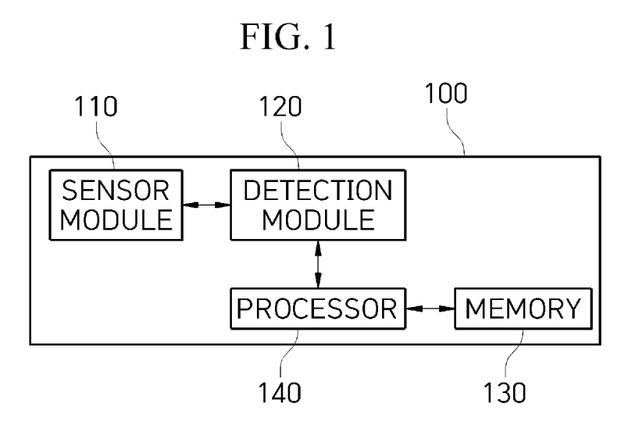
FIG. 1 is a block diagram of an apparatus for controlling rail boarding of a mobile robot according to an embodiment of the present invention.

FIG. 1 is a block diagram of an apparatus 100 for controlling rail boarding of a mobile robot according to an embodiment of the present invention.

The apparatus 100 for controlling rail boarding of a mobile robot according to the embodiment of the present invention includes a sensor module 110, a detection module 120, a memory 130, and a processor 140. In this case, an embodiment of the present invention may further include a driving unit (not illustrated) for driving a mobile robot, and contents of the driving unit will be omitted.

The sensor module 110 acquires sensing information for recognizing the surrounding environment of the mobile robot. The sensor module 110 may be applied with various sensors such as a sensor for general position detection, a camera, a mid-to-low price Lidar, and a depth camera.

In an embodiment, the sensor module 110 may acquire data frames at regular time intervals to recognize the surrounding environment.

Hereinafter, in the description of the present invention, the sensor module 110 is described as a camera module, but is not necessarily limited thereto.

The detection module 120 detects a boarding target rail of the mobile robot based on the sensing information, sets line information in the detected rail region, and sets an entry line from the line information.

The memory 130 stores a control program for the rail boarding of the mobile robot, and the processor 140 executes the program stored in the memory 130. Here, the memory 130 collectively refers to a non-volatile storage device that continuously maintains stored information even when power is not supplied and a volatile storage device.

Here, the memory 130 may include NAND flash memories such as a compact flash (CF) card, a secure digital (SD) card, a memory stick, a solid-state drive (SSD), and a micro SD card, magnetic computer storage devices such as a hard disk drive (HDD), and optical disc drives such as CD-ROM and DVD-ROM, and the like.

Meanwhile, rail information such as a thickness of a rail, a rail width, and a height with respect to a ground and characteristic information of the sensor module 110, that is, resolution, a focal length, and a field of view, a pixel size, and the like in the case of the camera module may be pre-stored in the memory 130. Line information, an entry line, or the like may be set in consideration of the characteristic information of the sensor module 110. In addition, shape information such as a size of a mobile robot, a position of the sensor module 110, and characteristics of a driving unit (wheel) may be pre-stored in the memory 130.

Figure 2A:
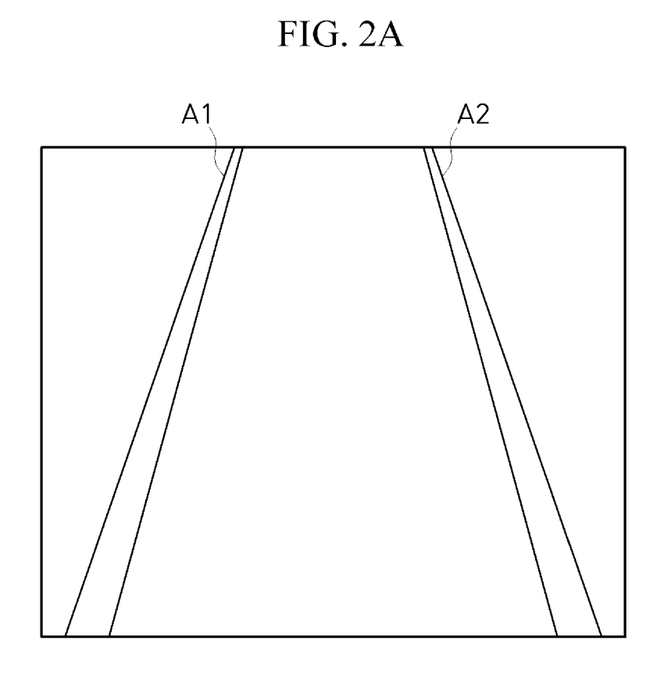
FIGS. 2A to 2C are diagrams for explaining contents of detecting a rail from an image frame.
Figure 2B:
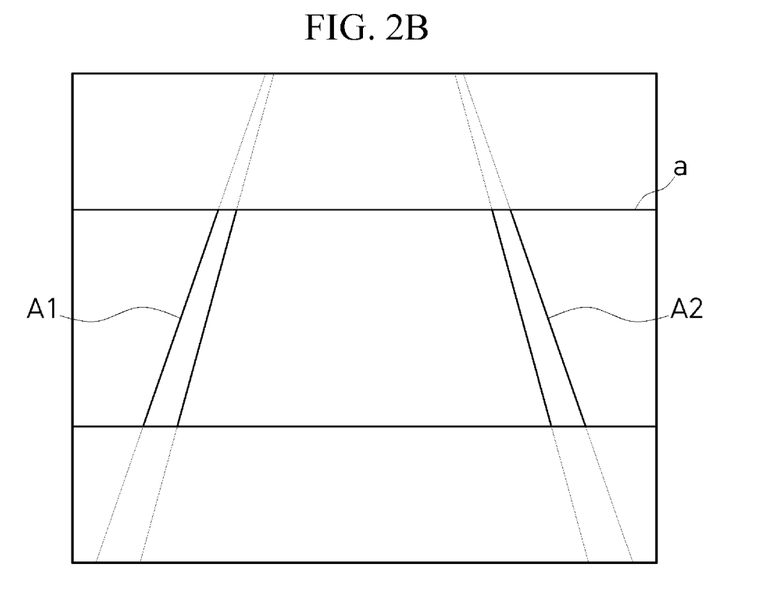
Figure 2C:
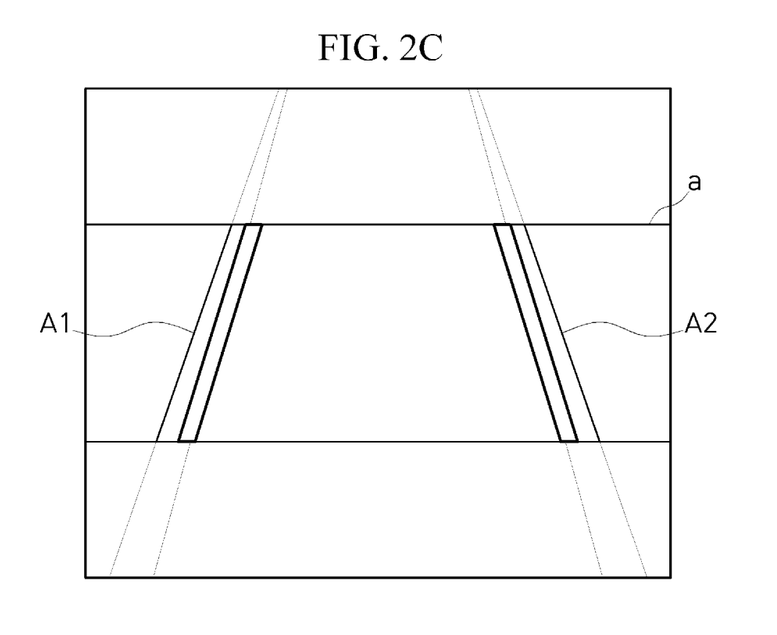

FIGS. 2A to 2C are diagrams for explaining contents of detecting a rail from an image frame.

In an embodiment, in the case where the mobile robot moves around a boarding rail by autonomous driving or other methods and wants to board the rail, when receiving an image including a rail (A1 or A2, or A1 and A2) photographed by the camera module (FIG. 2A), the detection module 120 may detect the rails A1 and A2 from the image (FIG. 2C).

In this case, the detection module 120 may set a region of interest (ROI) a for the received image if necessary as illustrated in FIG. 2B and detect the rails A1 and A2 from the ROI a.

Meanwhile, in the embodiment of the present invention, a rail detection-related technology can be implemented without difficulty by using a vehicle lane keeping device or a lane detection technology for lane departure prevention. Alternatively, the rail detection-related technology can be implemented by a deep learning method, edge detection, or the like.

Figure 3:
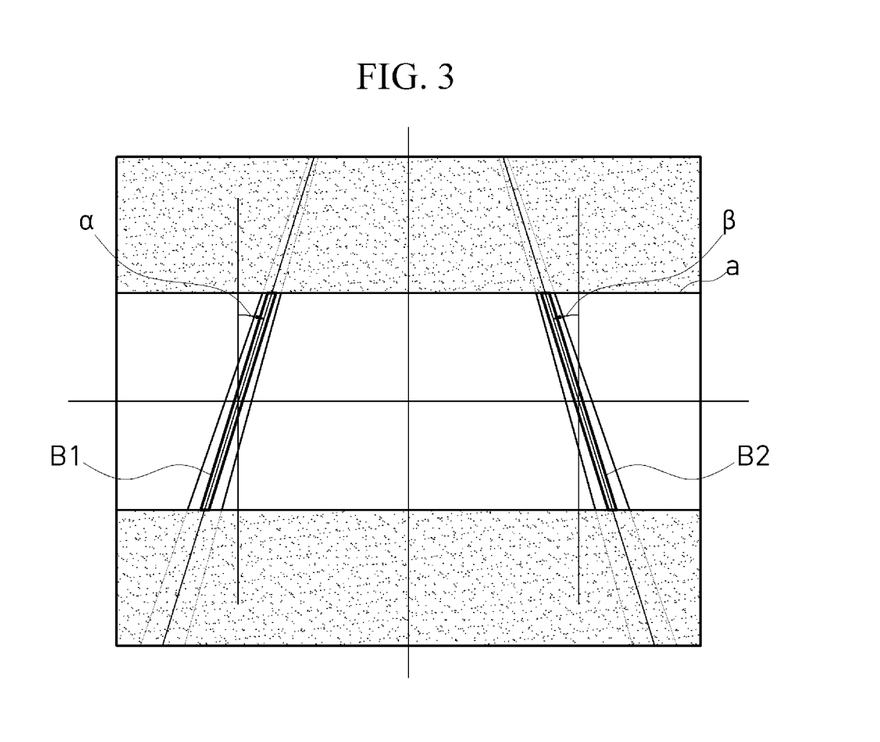
FIG. 3 is a diagram for explaining contents of setting line information from a rail.

FIG. 3 is a diagram for explaining contents of setting line information B1 and B2 from the rails A1 and A2.

In an embodiment, the detection module 120 sets the line information B1 and B2 from the detected rails A1 and A2. In this case, the line information B1 and B2 can be expressed by a linear equation such as, for example, y=ax+b. (For example: x: horizontal axis, y: vertical axis)

The detection module 120 may extract line information from the detected rails A1 and A2, and set at least one of first line information B1 and second line information B2 that correspond to rails corresponding to a first direction (e.g., left) and a second direction (e.g., right), respectively. For example, the first line information B1 may be expressed by a linear equation such as $Y_l = a_1 x + b_1$, and the second line information B2 may be expressed by a linear equation such as $y_r = a_2 x + b_2$.

Preferably, the detection module 120 may generate both the first line information B1 and the second line information B2, but may generate only one of the first line information B1 and the second line information B2 if necessary. In this case, the remaining line information may be generated using the rail information pre-stored in the memory 130. That is, when the first line information B1 is generated, the second line information B2 may be generated using shape information such as width information of the pre-stored rail information.

After the detection module 120 generates the line information B1 and B2, the detection module 120 sets an entry line from one or more line information B1 and B2 and provides the set entry line to the processor 140.

In an embodiment, the detection module 120 may set an entry line C that is parallel to the set line information B1 and B2 but is located in an exact center of a plurality pieces of line information.

In an embodiment, the entry line C may be set through Equation 1 below based on the line information B1 and B2 expressed by the above-described linear equation.

$$(\text{if } a1 \text{ and } a2 \text{ have the same sign}) \text{entry line} = -(b_1/a_1 + b_2/a_2)(2)x + (b_1 b_2)2 \qquad [\text{Equation 1}]$$

Figure 4A:
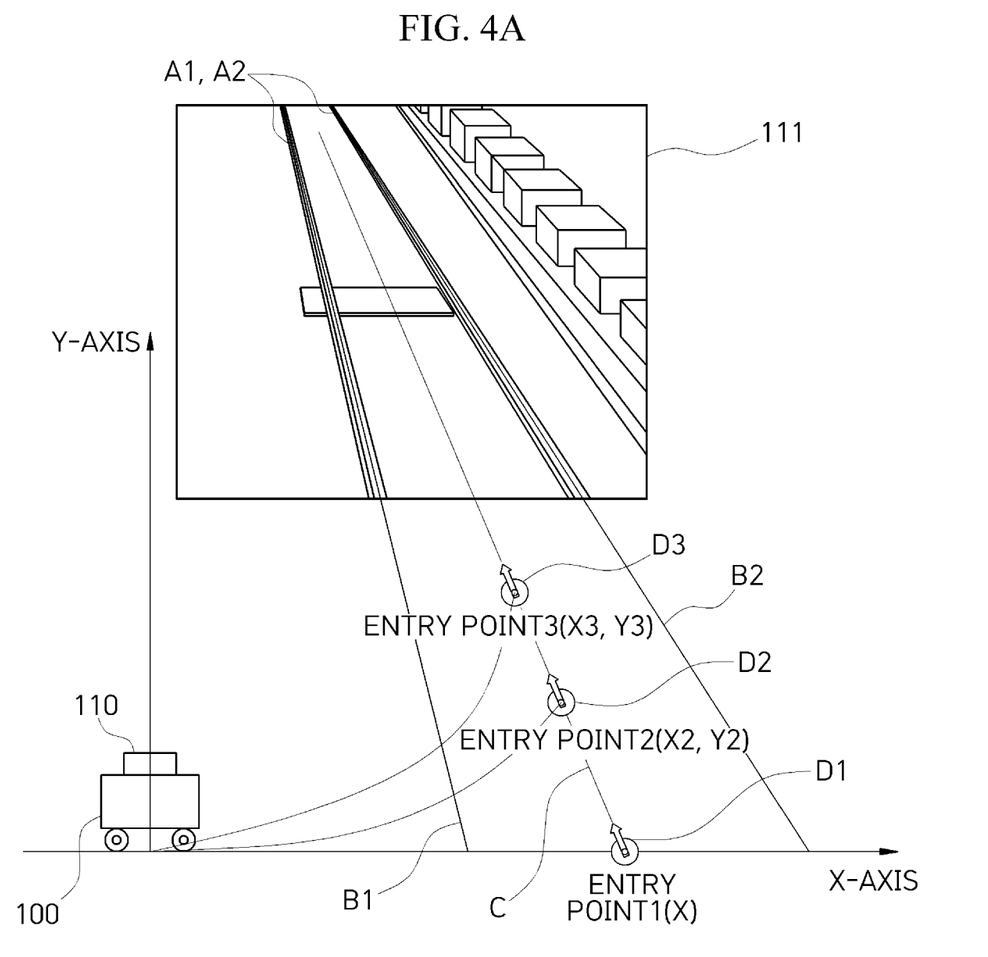
FIGS. 4A and 4B are diagrams for explaining contents of setting an entry line and an entry point.
Figure 4B:
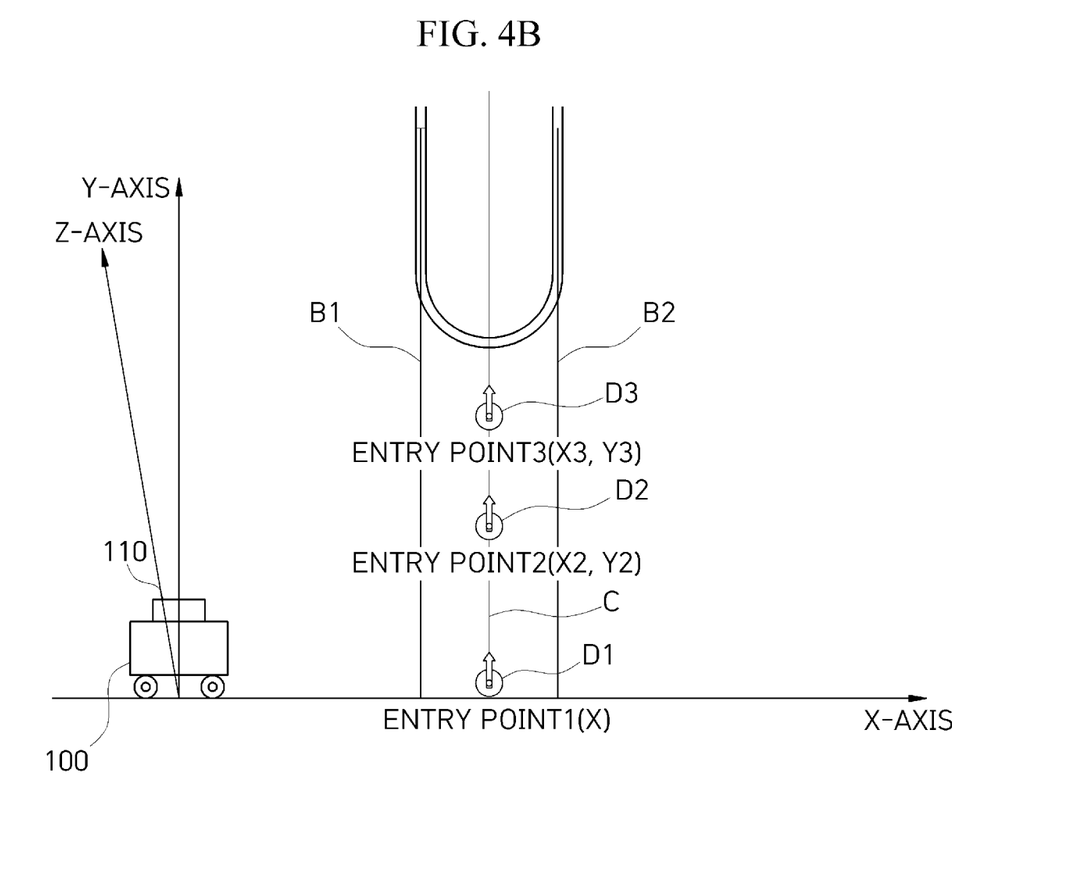

FIGS. 4A and 4B are diagrams for explaining contents of setting the entry line C and an entry point D.

In an embodiment, the processor 140 converts an entry line set in a sensor coordinate system received through the detection module 120 into entry line information based on a robot coordinate system.

In an embodiment, a converter used for conversion can be set by utilizing shape information of a robot and characteristics of a sensor. In general, the converter can be set through initial calibration.

In some embodiments of the present invention, the entry line may be set in consideration of the installation location shape information in the mobile robot of the sensor module 110.

In an embodiment, the processor 140 may correct the matched entry line C using rail information such as a height of a rail as illustrated in FIG. 4B. To this end, map information implemented through the robot coordinate system (world coordinate system or real coordinate system) may be pre-stored in the memory 130. That is, the processor 140 may convert the entry line set in the sensor coordinate system into the entry line C matched to the real coordinate system based on the real coordinate system of the map information stored in the memory 130.

After the entry line is set in the real coordinate system, the processor 140 may limit selects a section in which a mobile robot can be entered according to a current position of the mobile robot, driving characteristic information of the mobile robot, and the presence or absence of obstacles on the entry line C as illustrated in FIG. 4A. Accordingly, the processor 140 may set the entry point D on the entry line C in consideration of at least one of movement method information, entry distance information, and movement efficiency information of the mobile robot.

In an embodiment, the processor 140 may set a contact point between the entry line and a one-dimensional axial direction as an entry point D1 in order to move the mobile robot in the one-dimensional axial direction based on the current position of the mobile robot. For example, when the mobile robot needs to move in one dimension (x-axis) from the current position of the mobile robot, an entry point X(D1) on the entry line (C) may be set as an entry point.

In an embodiment, the processor 140 may set a point having a shortest distance between the current position and the entry line C as an entry point D2 in order to move the mobile robot in two dimensions based on the current position of the mobile robot. For example, when the mobile robot can move in two dimensions (x-axis and y-axis) from the current position of the mobile robot, the closest entry point (D2) X2 and Y2 on the entry line C may be set as the entry point.

On the other hand, the processor 140 may set a two-dimensional entry point (D3) X3 and Y3 as the optimal entry point D3 on the entry line C in consideration of the current position, driving characteristics, and movement efficiency of the mobile robot.

In addition, according to an embodiment of the present invention, various methods such as a rapidly exploring random tree (RRT) algorithm that configures map information including obstacles and sets an optimal entry point and a driving route to an entry point at the current location of the mobile robot may be applied.

Thereafter, the processor 140 generates driving information for the movement of the mobile robot within the set entry point and entry line.

In an embodiment, the processor 140 may generate driving information by using at least one of a moving speed, a moving direction, and a moving route of a mobile robot.

Alternatively, the processor 140 may generate driving information in consideration of an optimal moving route based on the current location and entry point of the mobile robot. Alternatively, the processor 140 may simultaneously set and generate an optimal entry point and driving information in consideration of the driving characteristics and movement efficiency of the mobile robot.

In this case, the driving information may be generated as driving information that may reach an entry line or an entry point through only one movement, or may be generated as driving information that may gradually reach an entry point according to multiple movements while repeating the above process (sensor module capture, detection, entry line setting, and entry point setting).

Such driving information is transmitted to the driving unit of the mobile robot, and a mobile robot moves to an entry point according to the driving information and may be boarded on a rail.

A mobile robot should be placed on an entry line in an entry direction during the movement.

Thereafter, the processor 140 determines whether the mobile robot has arrived on the entry line.

Thereafter, as an example in FIG. 3, in the case where a sensor is located at an exact center of a mobile robot, when the result of summing inclinations of each line information calculated from sensing information is 0 or a value near 0 or when information of an entry line is the same as or parallel to a y-axis, the processor 140 may determine that the mobile robot is on the entry line or has completed boarding to the entry point.

Thereafter, the processor 140 may board a rail by controlling a driving unit to go straight on an entry line.

Thereafter, as an example in FIG. 3, even when the sensor module is not located at an exact center, the processor 140 may determine whether a mobile robot is on an entry line using a result of summing each line information or an inclination of the entry line in consideration of the position of the sensor module 110.

Hereinafter, a method of controlling rail boarding for autonomous driving of a mobile robot according to an embodiment of the present invention will be described with reference to FIG. 5.

Figure 5:
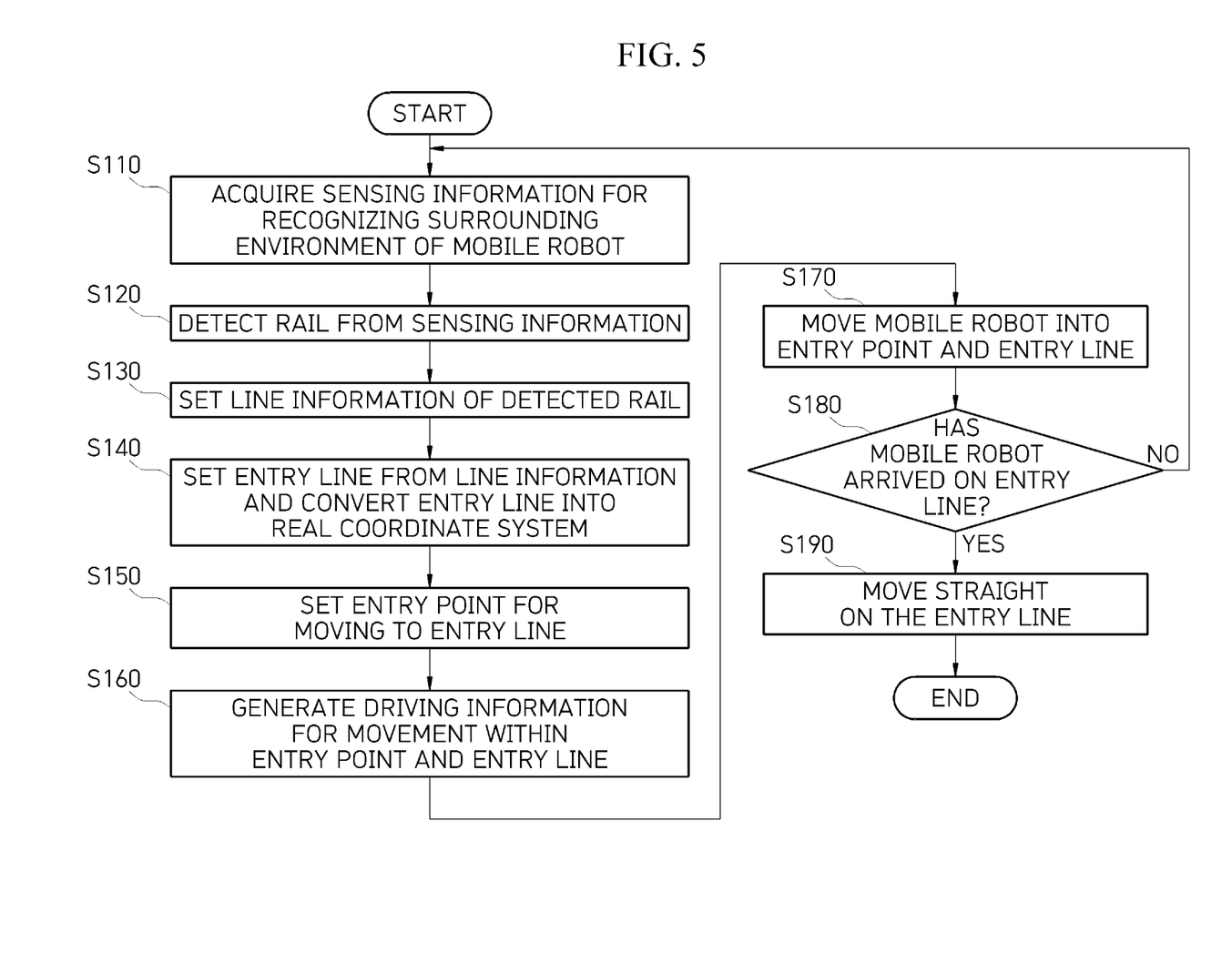
FIG. 5 is a flowchart of a method of controlling rail boarding of a mobile robot according to an embodiment of the present invention.

FIG. 5 is a flowchart of a method of controlling rail boarding of a mobile robot according to an embodiment of the present invention. Meanwhile, each step illustrated in FIG. 5 may be understood to be performed by an apparatus for controlling rail boarding of a mobile robot described above, but is not necessarily limited thereto.

According to an embodiment of the present invention, as a mobile robot moves around a boarding rail, sensing information for recognizing the surrounding environment is first acquired (S110).

Next, a boarding target rail of a mobile robot is detected from sensing information (S120), and line information is set in the detected rail (S130).

Next, an entry line is set from the line information and the set entry line is converted into a robot (real) coordinate system (S140).

Next, an entry point for moving to the entry line is set (S150), and driving information for moving within the set entry point and entry line is generated (S160).

Next, as a mobile robot moves into an entry point and an entry line (S170), it is checked whether the mobile robot has arrived on the entry line (S180), and when it is confirmed that the mobile robot has arrived on the entry line, the mobile robot moves straight on the entry line. (S190).

Meanwhile, in the above description, steps S110 to S190 may be further divided into additional steps or combined into fewer steps according to an implementation example of the present invention. Also, some steps may be omitted if necessary, and an order between the steps may be changed. Meanwhile, the contents of FIGS. 1 to 4 may also be applied to the contents of the method of controlling rail boarding of a mobile robot of FIG. 5.

The method of controlling rail boarding of a mobile robot according to the embodiment of the present invention described above may be implemented as a program (or application) and stored in a medium to be executed in combination with a computer that is hardware.

In order for the computer to read the program and execute the methods implemented as the program, the program may include a code coded in a computer language such as C, C++, JAVA, Ruby, or machine language that the processor (CPU) of the computer may read through a device interface of the computer. Such code may include functional code related to a function or such defining functions necessary for executing the methods and include an execution procedure related control code necessary for the processor of the computer to execute the functions according to a predetermined procedure. In addition, the code may further include a memory reference related code for which location (address street number) in an internal or external memory of the computer the additional information or media necessary for the processor of the computer to execute the functions is to be referenced at. In addition, when the processor of the computer needs to communicate with any other computers, servers, or the like located remotely in order to execute the above functions, the code may further include a communication-related code for how to communicate with any other computers, servers, or the like using the communication module of the computer, what information or media to transmit/receive during communication, and the like.

The storage medium is not a medium that stores images therein for a while, such as a register, a cache, a memory, or the like, but means a medium that semi-permanently stores the images therein and is readable by an apparatus. Specifically, examples of the storage medium include, but are not limited to, ROM, random-access memory (RAM), CD-ROM, a magnetic tape, a floppy disk, an optical image storage device, and the like. That is, the program may be stored in various recording media on various servers accessible by the computer or in various recording media on the computer of the user. In addition, media may be distributed in a computer system connected by a network, and a computer-readable code may be stored in a distributed manner.

The above description of the present invention is for illustrative purposes, and those skilled in the art to which the present invention pertains will understand that it may be easily modified to other specific forms without changing the technical spirit or essential features of the present invention. Therefore, it is to be understood that the embodiments described hereinabove are illustrative rather than being restrictive in all aspects. For example, each component described as a single type may be implemented in a distributed manner, and similarly, components described as distributed may be implemented in a combined form.

According to an embodiment of the present invention described above, by setting accurate entry line and entry point information for rail boarding of a mobile robot in an outdoor farm or an indoor farm where rails are installed, it is possible to enable accurate rail boarding of the mobile robots.

The effects of the present invention are not limited to the above-described effects, and other effects that are not mentioned may be obviously understood by those skilled in the art from the following description.

It is to be understood that the scope of the present invention will be defined by the claims rather than the above-described description and all modifications and alternations derived from the claims and their equivalents are included in the scope of the present invention.

What is claimed is:

1. An apparatus for controlling rail boarding for autonomous driving of a mobile robot, comprising:
   at least one processor; and memory having instructions stored thereon, which, when executed by the at least one processor, cause the at least one processor to:
   acquire sensing information for recognizing a surrounding environment of the mobile robot using a sensor;
   detect boarding target rails of the mobile robot based on the sensing information through training of a rail image, set line information in the detected rail region, and set an entry line, which is set in a sensor coordinate system, from the line information; and
   convert the entry line, which is set in the sensor coordinate system, into a robot (real) coordinate system, set an entry point for moving to the entry line, and generate driving information for movement within the set entry point and entry line,
   wherein the line information includes first and second line information on first and second lines corresponding to the detected rails, respectively, wherein the at least one a processor generates only one of the first and second line information.

2. The apparatus of claim 1, wherein the sensor is a camera module for photographing the surrounding environment of the mobile robot,
   when the at least one processor receives an image including rails photographed by the camera module, the at least one processor is configured to set a region of interest in the image and detect the rails from the region of interest, and
   the at least one processor is configured to:
   extract the line information from the detected rails,
   set only one of the first line information and the second line information, and
   set an entry line that is located at a center between the first line and the second line.

3. The apparatus of claim 1, wherein the at least one processor converts the entry line into an entry line of the robot coordinate system, and sets the entry line by correcting the entry line using rail information or shape information.

4. The apparatus of claim 1, wherein the at least one processor sets an entry point on the entry line in consideration of at least one of movement method information, entry distance information, and movement efficiency information of the mobile robot.

5. The apparatus of claim 1, wherein the at least one processor sets a contact point between the entry line and a one-dimensional axis as the entry point in order to move the mobile robot in a direction of the one-dimensional axis based on a current position of the mobile robot.

6. The apparatus of claim 1, wherein, in order to move the mobile robot in two dimensions based on a current position of the mobile robot, the at least one processor sets a point having a shortest possible entry distance between the current position and the entry line as the entry point.

7. The apparatus of claim 1, wherein the at least one processor sets an entry point on the entry line in consideration of at least one of movement method information, entry distance information, and movement efficiency information of the mobile robot at the current location of the mobile robot, and generates driving information for movement within the set entry point and entry line.

8. The apparatus of claim 1, wherein the at least one processor determines whether the mobile robot is on the entry line based on shape information of the mobile robot, the line information, or the set entry line.

9. A method of controlling rail boarding for autonomous driving of a mobile robot executed by a computer including at least one processor and memory having instructions stored thereon, which, when executed by the at least one processor, cause the at least one processor to control the rail boarding of the mobile robot, the method comprising:
acquiring sensing information for recognizing a surrounding environment of the mobile robot using a sensor;
detecting boarding target rails of the mobile robot from the sensing information through training of a rail image;
setting line information in the detected rails;
setting an entry line from the line information and converting the entry line, which is set in a sensor coordinate system, into a robot (real) coordinate system;
setting an entry point for moving to the entry line;
generating driving information for movement within the set entry point and entry line;
determining whether the mobile robot exists on the entry line according to the movement of the mobile robot; and
driving the mobile robot to move on the entry line when the mobile robot exists on the entry line,
wherein the line information includes first and second line information on first and second lines corresponding to the detected rails, respectively, wherein the at least one a processor generates only one of the first and second line information.

10. The method of claim 9, wherein, in the acquiring of the sensing information for recognizing the surrounding environment of the mobile robot, an image including rails photographed by the sensor including a camera module is received,
the detecting of the boarding target rails by the mobile robot from the sensing information includes detecting rails from a region of interest, and
the setting of the line information in the detected rails includes:
setting an entry line by setting only one of the first line information and the second line information.

11. The method of claim 9, wherein, in the converting of the set entry line into the robot coordinate system, the set entry line is converted into an entry line based on the robot coordinate system by using an initially set converter, but in some cases, the entry line is converted into the robot coordinate system using rail information or shape information.

12. The method of claim 9, wherein, in the setting of the entry point for moving to the entry line, an entry point on the entry line is set in consideration of at least one of movement method information, entry distance information, and movement efficiency information of the mobile robot.

13. The method of claim 9, wherein, in the setting of the entry point for moving to the entry line, a contact point between the entry line and a one-dimensional axis is set as the entry point in order to move the mobile robot in a direction of the one-dimensional axis based on a current position of the mobile robot.

14. The method of claim 9, wherein, in the setting of the entry point for moving to the entry line, in order to move the mobile robot in two dimensions based on a current position of the mobile robot, a point having a shortest possible entry distance between the current position and the entry line is set as the entry point.

15. The apparatus of claim 1, wherein each of the first and second line information is represented by a linear equation for each of first and second lines corresponding to the detected rails.

16. The method of claim 9, wherein each of the first and second line information is represented by a linear equation for each of first and second lines corresponding to the detected rails.

* * * * *